United States Patent
Gehrmann et al.

(10) Patent No.: US 11,232,263 B2
(45) Date of Patent: Jan. 25, 2022

(54) GENERATING SUMMARY CONTENT USING SUPERVISED SENTENTIAL EXTRACTIVE SUMMARIZATION

(71) Applicant: Adobe Inc., San Jose, CA (US)

(72) Inventors: Sebastian Gehrmann, Cambridge, MA (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 133 days.

(21) Appl. No.: 16/534,366

(22) Filed: Aug. 7, 2019

(65) Prior Publication Data
US 2021/0042391 A1    Feb. 11, 2021

(51) Int. Cl.
*G06F 40/30* (2020.01)
*G06N 3/08* (2006.01)

(52) U.S. Cl.
CPC .............. *G06F 40/30* (2020.01); *G06N 3/08* (2013.01)

(58) Field of Classification Search
CPC .................................. G06F 40/30; G06N 3/08
See application file for complete search history.

(56) References Cited

U.S. PATENT DOCUMENTS

2020/0167391 A1* 5/2020 Zheng ..................... G06F 40/30

OTHER PUBLICATIONS

Cheng et al., Neural Summarization by Extracting Sentences and Words, In Proceedings of the 54th Annual Meeting of the Association for Computational Linguistics, vol. 1, Aug. 7-12, 2016, pp. 484-494.
Dlikman et al., Using Machine Learning Methods and Linguistic Features in Single-Document Extractive Summarization, In DMNLP@PKDD/ECML, 2016, 8 pages.
Hermann et al., Teaching Machines to Read and Comprehend, NIPS'15: Proceedings of the 28th International Conference on Neural Information Processing Systems, vol. 1, Dec. 2015, pp. 1-14.
Hochreiter et al., Long Short-Term Memory, Neural Computation, vol. 9, No. 8, Nov. 1997, pp. 1735-1780.
Kim et al., Character-Aware Neural Language Models, AAAI'16: Proceedings of the Thirtieth AAAI Conference on Artificial Intelligence, Feb. 2016, 9 pages.
Mikolov et al., Distributed Representations of Words and Phrases and Their Compositionality, In Advances in Neural Information Processing Systems, Jan. 2013, pp. 1-9.
Modani et al., Creating Diverse Product Review Summaries: A Graph Approach, International Conference on Web Information Systems Engineering, Nov. 2015.

(Continued)

*Primary Examiner* — Kevin Ky
(74) *Attorney, Agent, or Firm* — Kilpatrick Townsend & Stockton LLP (57) ABSTRACT

Certain embodiments involve a method for generating a summary. The method includes one or more processing devices performing operations including generating a set of word embeddings corresponding to each word of a text input. The operations further include generating a set of selection probabilities corresponding to each word of the text input using the respective word embeddings. Further, the operations include calculating a set of sentence saliency scores for a set of sentences of the text input using respective selection probabilities of the set of selection probabilities for each word of the text input. Additional, the operations include generating the summary of the text input using a subset of sentences from the set of sentences with greatest sentence saliency scores from the set of sentence saliency scores.

18 Claims, 5 Drawing Sheets

(56) References Cited

OTHER PUBLICATIONS

Modani et al., Generating Multiple Diverse Summaries, International Conference on Web Information Systems Engineering, Nov. 2016, 8 pages.

Nallapati et al., Abstractive Text Summarization using Sequence-to-sequence RNNs and Beyond, Proceedings of the 20th SIGNLL Conference on Computational Natural Language Learning, Available online at: http://aclweb.org/anthology/K/K16/K16-1028.pdf, Aug. 7-12, 2016, pp. 280-290.

Nallapati et al., Classify or Select: Neural Architectures for Extractive Document Summarization, Under review as a conference paper at ICLR 2017, Nov. 2016, pp. 1-13.

Paulus et al., A Deep Reinforced Model for Abstractive Summarization, Published as a conference paper at ICLR 2018, 2017, pp. 1-13.

Pennington et al., GloVe: Global Vectors for Word Representation, Proceedings of the 2014 Conference on Empirical Methods in Natural Language Processing (EMNLP), Oct. 2014, pp. 1532-1543.

Peters et al., Deep Contextualized Word Representations, Proceedings of the 2018 Conference of the North American Chapter of the Association for Computational Linguistics: Human Language Technologies, vol. 1, Jun. 2018, pp. 2227-2237.

Peters et al., Semi-Supervised Sequence Tagging with Bidirectional Language Models, Computation and Language, Apr. 2017, 10 pages.

Rush et al., A Neural Attention Model for Abstractive Sentence Summarization, Proceedings of the 2015 Conference on Empirical Methods in Natural Language Processing, Sep. 2015, pp. 379-389.

See et al., Get to the Point: Summarization with Pointer-Generator Networks, Conference: Proceedings of the 55th Annual Meeting of the Association for Computational Linguistics, vol. 1, Apr. 25, 2017, 20 pages.

Vinyals et al., Pointer Networks, In Advances in Neural Information Processing Systems, 2015, pp. 1-9.

Zhou et al., Neural Document Summarization by Jointly Learning to Score and Select Sentences, In Proceedings of the 56th Annual Meeting of the Association for Computational Linguistics, vol. 1, Jul. 2018, pp. 654-663.

\* cited by examiner

GENERATING SUMMARY CONTENT USING SUPERVISED SENTENTIAL EXTRACTIVE SUMMARIZATION

TECHNICAL FIELD

This disclosure relates generally to machine-learning techniques. More specifically, but not by way of limitation, this disclosure relates to using a machine-learning text summarization model to generate sentential extractive summaries of text inputs.

BACKGROUND

Content summarization of written communication is typically generated by computer-based methods tasked with summarizing lengthy text passages. For example, the computer-based methods may receive a text passage as input and output a summary based on the text passage. Implementing such a text summarization process on a computing system requires providing a structured set of rules or a structured model for the computing system to execute. Deficiencies in such rules or models often result in summaries that suffer from limited grammatical coherence, inaccuracies between the summary and the original text passage, and processing inefficiencies associated with the computer-based method.

As an example, existing computer-based methods generate summaries based on feature extraction in the text passages. That is, the existing computer-based methods involve generating the summary by focusing on aspects of the text passages relevant to one or more features. Such methods often result in a loss of coherence, accuracy, or both in the summaries when compared to the original text passage because they don't reproduce representations of complete thoughts (e.g., sentences) in the original text passage. Other computer-based methods rely heavily on significant training of models and computationally expensive summarization techniques. For example, the computer-based methods can require tens of thousands of training examples to train the models used to generate the summaries.

SUMMARY

Certain embodiments involve generating summaries of text input using a supervised sentential extraction model. For example, a method for generating a summary includes one or more processing devices performing operations including generating a set of word embeddings corresponding to each word of a text input received at a summary generation module. The operations further include generating a set of selection probabilities corresponding to each word of the text input using the respective word embeddings. Further, the operations include calculating a set of sentence saliency scores for a set of sentences of the text input using respective selection probabilities of the set of selection probabilities for each word of the text input. Additional, the operations include generating the summary of the text input using a subset of sentences from the set of sentences with greatest sentence saliency scores from the set of sentence saliency scores.

In another embodiment, a computing system includes a means for receiving training data comprising a training text input and a summary corresponding to the training text input and a means for generating a binary tag for each word of the training text input using a greedy algorithm. Additionally, the computing system includes a means for training a summary generation model by training (i) a first set of trainable parameters of a sigmoid function identifying a probability that each word of the training text input is used in the summary and (ii) a second set of trainable parameters of a contextual embedding. Training the first set of trainable parameters and the second set of trainable parameters is accomplished by maximizing a conditional probability of an accuracy of the binary tag generated for each word. Further, the computing system includes a means for generating a set of word embeddings corresponding to each word of a text input received at the summary generation module and a means for generating a set of selection probabilities corresponding to each word of the text input using the respective word embeddings. Furthermore, the computing system includes a means for calculating a set of sentence saliency scores for a set of sentences of the text input using respective selection probabilities of the set of selection probabilities for each word of the text input. Moreover, the computing system includes a means for generating a text input summary of the text input using a subset of sentences from the set of sentences with greatest sentence saliency scores from the set of sentence saliency scores.

In another embodiment, a non-transitory computer-readable medium having instructions stored thereon that are executable by one or more processing devices to perform operations. The operations include generating a static channel word embedding and a contextual word embedding corresponding to each word of a text input received at a summary generation module. Additionally, the operations include generating a set of selection probabilities corresponding to each word of the text input using the respective word embeddings. Further, the operations include calculating a set of sentence saliency scores for a set of sentences of the text input using respective selection probabilities of the set of selection probabilities for each word of the text input. Furthermore, the operations include generating the summary of the text input using a subset of sentences from the set of sentences with greatest sentence saliency scores from the set of sentence saliency scores.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Certain embodiments of the present disclosure involve using a summary generation model to generate a summary of text input. Conventional solutions for automated summary generation limit the ability to convey accurate and coherent information to an audience through the summaries. That is, the inaccurate nature of automated summary generation limits the actual benefit provided by software tools that perform the automated summary generation. Moreover, a complexity associated with training the models used to generate the summaries may limit an effectiveness of the summary generation based on limited availabilities of training data and an increase in processing cost.

Certain embodiments described herein address these issues by, for example, automatically generating summaries of text input using full sentences of the text input. That is, the summaries are automatically generated using a subset of sentences from the text input. For instance, a summary generation model may summarize text input by automatically determining a ranking of the sentences within the text input based on predicted importance of the sentences. A threshold number of the sentences deemed most important by the ranking of the sentences may be provided as the summary of the text input. By generating the summaries of the text input in a sentential manner (i.e., using complete sentences from the text input), the summary generation model provides summaries with grammatical sentences and correct information. Further, the summary generation model is much more data-efficient than data-driven models that are associated with abstractive summary models. Thus, the automatic generation of the summaries provides an efficient and accurate mechanism to generate summaries as compared to certain conventional solutions described above.

The following non-limiting example is provided to introduce certain embodiments. In this example, a computing system may use a summary generation model to generate a summary of text input. The summary generation model may be trained using a corpus of training text input and associated summaries generated for the text input. To train the summary generation model, a binary tag (e.g., a 0 or a 1) for each word of the training text input is generated based on a use of a word from the input text in the summary. For example, a value of 0 is assigned to a word that is not used in the summary, and a value of 1 is assigned to each word that is used in the summary. Using the assigned binary tags, trainable parameters may be trained to maximize a conditional probability of all of the words from the training text input. The training text input may include articles or news stories, and the summaries may be summaries previously generated for the training text input.

Continuing with this example, the trained summary generation model (e.g., including the trained parameters) may receive or otherwise access a text input of which a summary is desired. The trained summary generation model may use a word embedding model to generate a set of word embeddings corresponding to each word of the text input. In an example, the word embeddings may include a static channel word embedding that is not tuned during a training process of the summary generation model. This static channel word embedding includes a vector representation of each word of the input text. Additionally, the word embeddings may also include a contextual word embedding that is tuned during the training process by adjusting trainable parameters. The contextual word embedding may include another a vector representation of each word of the input text. In an example, the vector representations of each word are concatenated and provided as input to a long short-term memory neural network to compute a combined representation of each word.

With the combined representation of each word from the respective word embeddings, the summary generation model may generate a set of selection probabilities corresponding to each word of the text input. That is, each word may be assigned a probability of being used in the summary of the text input. The set of selection probabilities may be generated using a sigmoid function. Trainable parameters that are trained during the training process of the summary generation model are used to predict a score (i.e., a logit), which is used as an input to the sigmoid function to generate the set of selection probabilities.

The selection probabilities may be used by a sentence saliency module to calculate a set of sentence saliency scores. In an example, the sentence saliency scores may be generated for each sentence of the text input using a summation of the selection probabilities for each word divided by a total number of words in the respective sentence. The sentence saliency scores provide a value that serves as an estimation for sentence importance within the text input based on the words used within the sentence.

To generate the summary of the text input, a sentence selection module may select a subset of sentences from the text input with the greatest sentence saliency scores. In an example, the sentence selection module may select a predetermined number of sentences with the greatest sentence saliency scores. In another example, the sentence selection module may select the subset of sentences with sentence saliency scores that exceed a sentence saliency score threshold. The resulting summaries provide content that is both grammatically and factually correct.

As used herein, the term "summary generation model" is used to refer to a trained model that receives text input and generates a summary using sentences of the text input. In an example, the summary generation model is trained with a corpus of unsupervised training data.

As used herein, the term "sentential summary" is used to refer to a summary generated from complete sentences of the text input provided to the summary generation model. In an example, the sentential summary may be grammatically correct and accurately represent the text input.

As used herein, the term "training data" is used to refer to data input to the summary generation model to train the summary generation model. In an example, the training data includes text input and a supervised ground truth summary based on the text input.

As used herein, the term "sentence saliency" is used to refer to a measurement predicting an importance of a sentence of the text input in relation to other sentences of the text input. In an example, the summary generation model uses sentences with a greatest sentence saliency as the input text summary.

Certain embodiments described herein may facilitate generation of summaries of text input. The summaries are generated directly from the text input as sentential summaries. That is, the summaries include a set of whole sentences from the text input. It is desirable to use computers to generate summaries of the text input. However, existing techniques for summarizing the text input result in summaries lacking information accuracy and grammatical correctness. Further, existing techniques for generating summaries may be data intensive and require large amounts of training data to generate accurate summaries. Accordingly, the existing techniques suffer from inaccuracies and excessive computational costs. To solve these issues, certain techniques described herein may facilitate generation of summaries of the text input by estimating an importance of sentences within the text input and outputting a summary that includes sentences of the text input determined to be the most important. Thus, the summaries are generated in a manner that is grammatically correct, and the information included in the individual sentences of the summaries is always correct. Further, the summary generation model is trainable with an unsupervised corpus of training data that is much smaller than a corpus of training data required for other data intensive summary generation techniques.

Example of an Operating Environment for a Summary Generation Model

Figure 1:
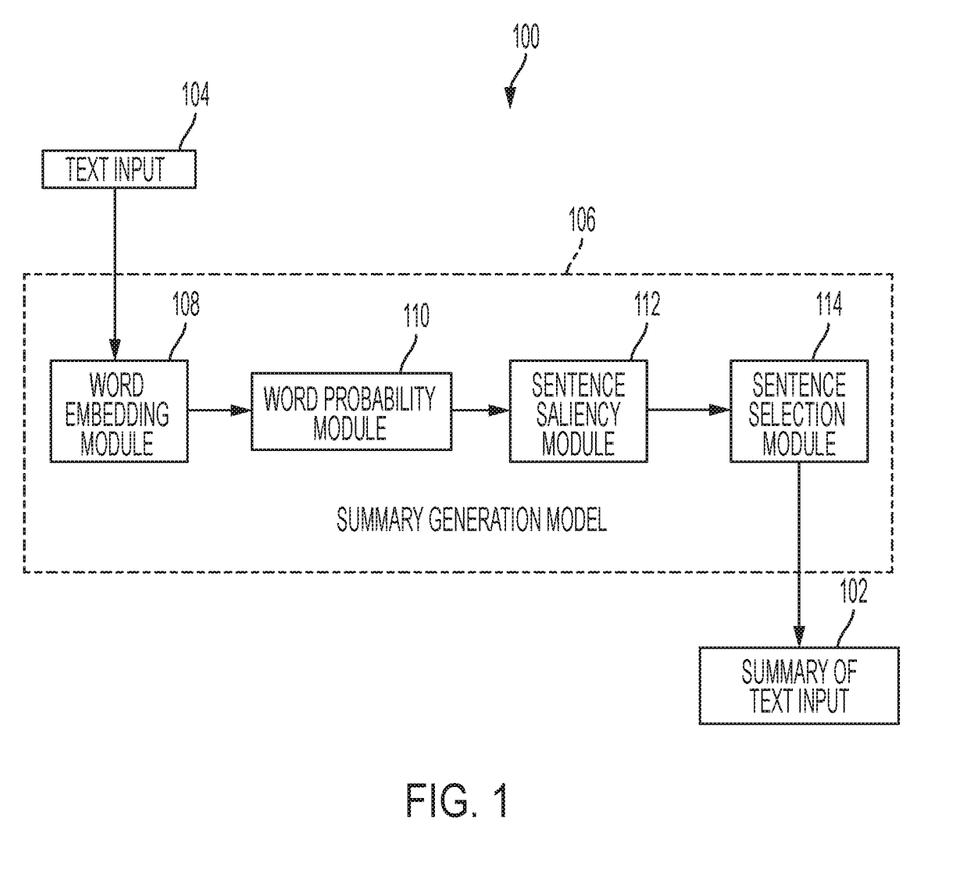
FIG. 1 depicts an example of a computing environment for generating a summary of text input by a summary generation model, according to certain embodiments of the present disclosure.

Referring now to the drawings, FIG. 1 depicts an example of a computing environment 100 for generating a summary 102 of a text input 104 using a summary generation model 106. As described herein, the summary 102 may be a sentential summary of the text input 104. That is, the summary 102 may include a selection of complete sentences from the text input 104. Because of the sentential nature of the summary 102, the summary generation model 106 is able to solve the inaccuracy problems of existing summary generation techniques. That is, complete sentences used in the summary 102 from the text input 104 ensure accuracy of the information presented in each sentence of the summary 102.

In an example, the summary generation model 104 is able to identify and rank sentences from the text input 104 based on a predicted importance of each sentence in the text input 104. The summary 102 may be generated from the sentences of the text input 104 that include the greatest predicted importance. For example, a text input 104 may be summarized using five sentences from the text input 104 predicted to have the greatest importance. The summary generation model 106 may also be tuned to have larger or smaller summaries (e.g., four or fewer sentences or six or more sentences). Further, the summary generation model 106 may include a word embedding module 108, a word probability module 110, a sentence saliency module 112, and a sentence selection module 114, which are executed by one or more computing devices to generate the summary 102 of the text input 104.

The word generation model 106 receives or otherwise accesses the text input 104 at the word embedding module 108. The text input 104 includes a set of text that a user would like summarized. Examples of the text input 104 may include electronic documents, news articles, technical documents, or any other input data with text capable of summarization. The word embedding module 108 may generate a representation of each word in the text input 104 as a high-dimensional vector. Such a representation enables different words to share properties. For example, two similar words are represented by vectors with a small vector difference, while two dissimilar words are represented by vectors with a relatively large vector difference. In an example, one or more of the word embeddings provided by the word embedding module 108 may be trained using unsupervised training data.

For a given word $x_i$ in the text input 104, two different word embedding channels, $e_i^{(w)}$ and $e_i^{(c)}$, may be used. The $e^w$ embedding may represent a static channel of pre-trained word embeddings that are not fine-tuned based on additional training data. In an example, Global Vectors for Word Representation (GloVe) embeddings are used. In additional examples, other embeddings may also be used, such as word2vec embeddings. The static channel word embedding may convert each word of the text input 104 into a static channel vector representation.

The $e^c$ embedding may represent a contextual embedding from a pre-trained language model. In an example, the contextual embedding may be generated using Embeddings from Language Models (ELMo). Other contextual embedding language models may also be used. The contextual embedding language models aim to predict a next word given all preceding words in a sequence. Accordingly, the contextual embedding language models may provide a representation of each word based on the context of the word within a sentence. In an example, ELMo uses a character-aware word embedding followed by two bidirectional long short-term memory (LSTM) layers $h_i^{(1)}$ and $h_i^{(2)}$. An advantage of using the character-aware word embedding followed by two bidirectional LSTM layers is that the contextual embeddings can be fine-tuned to learn a task-specific embedding $e_i^{(c)}$ as a linear combination of states of each LSTM layer and a token embedding. For example, the task-specific embedding $e_i^{(c)}$ may be represented by the following equation:

$$e_i^{(c)} = \gamma \times \sum_{\ell=0}^{2} s_j \times h_i^{(\ell)} \quad \text{(Equation 1)}$$

where $\gamma$ and $s_{0,1,2}$ are trainable parameters. Both the static channel embedding $e_i^{(w)}$ and the task-specific embedding $e_i^{(c)}$ are concatenated into a single vector. The single vector is used as input to an additional bidirectional LSTM neural network that provides a combined representation $h_i$.

With the combined representation $h_i$ of each word of the text input 104 generated by the word embedding module 108, the word probability module 110 generates a selection probability for each word in the text input 104. The selection probability represents a probability that a given word will be selected for the summary 102 of the input text 104. The following equation may be used to represent to the selection probability:

$$q_i = \delta(W_s h_i + b_s) \quad \text{(Equation 2)}$$

where $W_s$ and $b_s$ are trainable neural parameters and $\delta(*)$ is a sigmoid function that generates the selection probability between 0 and 1 based on the combined representation $h_i$ of a word and the trainable neural parameters $W_s$ and $b_s$.

The sentence saliency module 112 may use the selection probability to generate a saliency score for each sentence of the input text 104. The saliency score provides an indication of sentence saliency (i.e., sentence importance) within the input text 104. To generate the saliency score, the selection probabilities of each word for a sentence in the input text 104 are added together and divided by a total number of words in the sentence. This process is repeated for each of the sentences within the input text 104, and the sentence saliency for each sentence may be represented by the following equation:

$$\text{saliency}(\text{sent}) = \frac{1}{|\text{sent}|} \sum_{i=1}^{|\text{sent}|} p(t_i \mid \text{sent}) \quad \text{(Equation 3)}$$

where $|\text{sent}|$ represents a number of words in a sentence, $t_i$ represents a specific word within the sentence, and $p(t_i|\text{sent})$ is a conditional probability of a word of a given sent being selected for the summary, as provided in Equation 2. By adding the selection probabilities of each word of the sentence sent and dividing the total by the number of words in the sentence sent, a saliency score is generated to indicate a relative importance of the sentence with respect to other sentences in the input text 104.

After determining the saliency score for each sentence in the input text 104, the sentence selection module 114 selects the sentences from the input text 104 to be used in the summary 102. In an example, the sentence selection module 114 may select the sentences with the greatest sentence saliency scores. For example, the sentence selection module 114 may select a pre-set number of sentences from the input text 104 based on the sentence saliency scores. The following equation may be used to define the sentence selection:

$$\underset{summary \subset para, |summary|=k}{\operatorname{argmax}} \sum_{sent \in summary} \operatorname{saliency}(sent) \quad \text{(Equation 4)}$$

where k is a number of sentences to be selected for inclusion in the summary 102. In other examples, the sentence selection module 114 may select sentences from the input text 104 with a sentence saliency score that exceeds a score threshold. In another example, the sentence selection module 114 may select a number of sentences based on a length of the input text 104. For example, the summary 102 may a number of sentences that make up 20% of the number of sentences in the input text 104. Larger or smaller percentages may also be used.

The selected sentences are then output as the summary 102 of the input text 104 by the summary generation model 106. In an example, outputting the summary 102 may include printing the text of the summary 102 to a physical medium. Outputting the summary 102 may also include displaying the summary 102 on a user interface associated with the computing environment 100. In other examples, outputting the summary 102 may be limited to electronic storage of the summary 102 on a memory associated with the computing environment 100.

Examples of Generating a Sentential Summary

Figure 2:
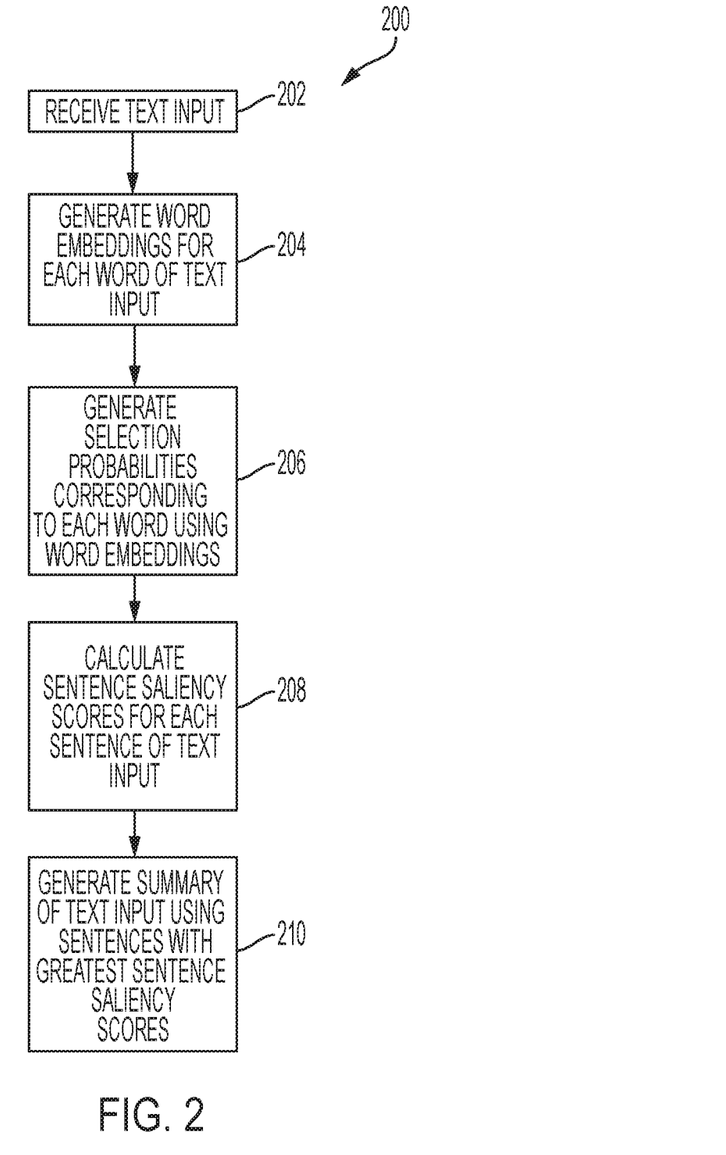
FIG. 2 depicts an example of a process for using the summary generation model of FIG. 1 to generate the summary of text input, according to certain embodiments of the present disclosure.

FIG. 2 depicts an example of a process 200 for using the summary generation model 106 to generate the summary 102 of the text input 104. One or more processing devices implement operations depicted in FIG. 2 by executing suitable program code (e.g., the summary generation model 106). For illustrative purposes, the process 200 is described with reference to certain examples depicted in the figures. Other implementations, however, are possible.

At block 202, the process 200 involves receiving the text input 104 at the summary generation model 106. One or more processing devices execute the summary generation model 106 (or suitable other program code) to implement block 202. For instance, executing the summary generation model 106 causes one or more processing devices to receive or otherwise access the text input 104 that is stored in a non-transitory computer-readable medium. In some embodiments, receiving or accessing the text input 104 involves communicating, via a data bus, suitable signals between a local non-transitory computer-readable medium and the processing device. In additional or alternative embodiments, receiving or accessing the text input 104 involves communicating, via a data network, suitable signals between a computing system that includes the non-transitory computer-readable medium and a computing system that includes the processing device. Examples of the text input 104 include text segments from news articles, scholarly publications, emails, or any other segments of text where a summary of the text input 104 is desirable.

At block 204, the process 200 involves generating word embeddings for each word of the text input 104. One or more processing devices execute the word embedding module 108 (or other suitable program code) to implement block 204. In an example, two different word embedding channels, er and $e_i^{(w)}$ and $e_i^{(c)}$, may be used. The $e^w$ embedding may represent a static channel of pre-trained word embeddings that are not fine-tuned based on additional training data. Further, the $e^c$ embedding may represent a contextual embedding from a pre-trained language model. Both the static channel embedding $e_i^{(w)}$ and the task-specific embedding $e_i^{(c)}$ may be concatenated into a single vector, and the single vector may be used as input to an additional bidirectional LSTM neural network that provides a combined representation $h_i$.

At block 206, the process 200 involves generating selection probabilities corresponding to each word of the input text 104 using the word embeddings (e.g., the combined representation $h_i$). One or more processing devices execute the word probability module 110 (or other suitable program code) to implement block 206. In an example, the word probability module 110 uses the combined representation $h_i$ to determine a selection probability for each word of the input text 104. The selection probability may represent the probability that the individual words in the input text 104 will be used in the summary 102. Equation 2, as described above with respect to FIG. 1, may provide the selection probabilities.

At block 208, the process 200 involves calculating sentence saliency scores for each sentence of the text input 104. One or more processing devices execute the sentence saliency module 112 (or other suitable program code) to implement block 208. The sentence saliency module 112 may use the selection probabilities generated at block 210 with Equation 3, as described above with respect to FIG. 1, to generate the saliency scores for the sentences of the input text 104. The saliency score provides an indication of sentence saliency (i.e., predicted sentence importance) within the input text 104.

At block 210, the process 200 involves generating the summary 102 of the text input 104 using sentences of the text input 104 with the greatest sentence saliency scores. One or more processing devices execute the sentence selection module 114 (or other suitable program code) to implement block 208. In an example, the sentence selection module 114 may select a pre-set number of sentences from the input text 104 based on the sentence saliency scores. For example, the sentence selection module 115 may select five sentences from the text input 104 that have the greatest sentence saliency scores. More or fewer sentences may also be selected from the text input 104. In other examples, the sentence selection module 114 may select sentences from the input text 104 with a sentence saliency score that exceeds a score threshold. In another example, the sentence selection module 114 may select a number of sentences based on a length of the input text 104. For example, the summary 102 may a number of sentences that make up 20% of the number of sentences in the input text 104. Larger or smaller percentages may also be used.

The selected sentences may then be output as the summary 102 of the input text 104 by the summary generation model 106. In an example, outputting the summary 102 may include printing the text of the summary 102 to a physical medium. Outputting the summary 102 may also include displaying the summary 102 on a user interface associated with the computing environment 100. In other examples, outputting the summary 102 may be limited to electronic storage of the summary 102 on a memory associated with the computing environment 100.

In one or more additional examples, the process 200 may be tuned to generate the summaries 102 at a phrase level rather than the sentence level described above. For example, the sentence saliency scores may be replaced by phrase saliency scores where the summary generation model 106 is able to determine importance of individual phrases rather than only the importance of a sentence. For example, instead of averaging saliency scores at a per-sentence level, the process 200 may be tuned to average saliency scores per n-gram to extract phrases directly. Such a technique may be used for automated highlighting of text within the text input 104, for example.

In another example, the process 200 may include the ability to focus on a specific element of the text input 104. For example, a user may want a summary 102 that focuses on a company A, and the word probability module 110 may be tuned to give mentions of company A a larger selection probability. Thus, the summary 102 may ultimately include more information concerning the company A.

Examples of Training a Word Generation Model

Figure 3:
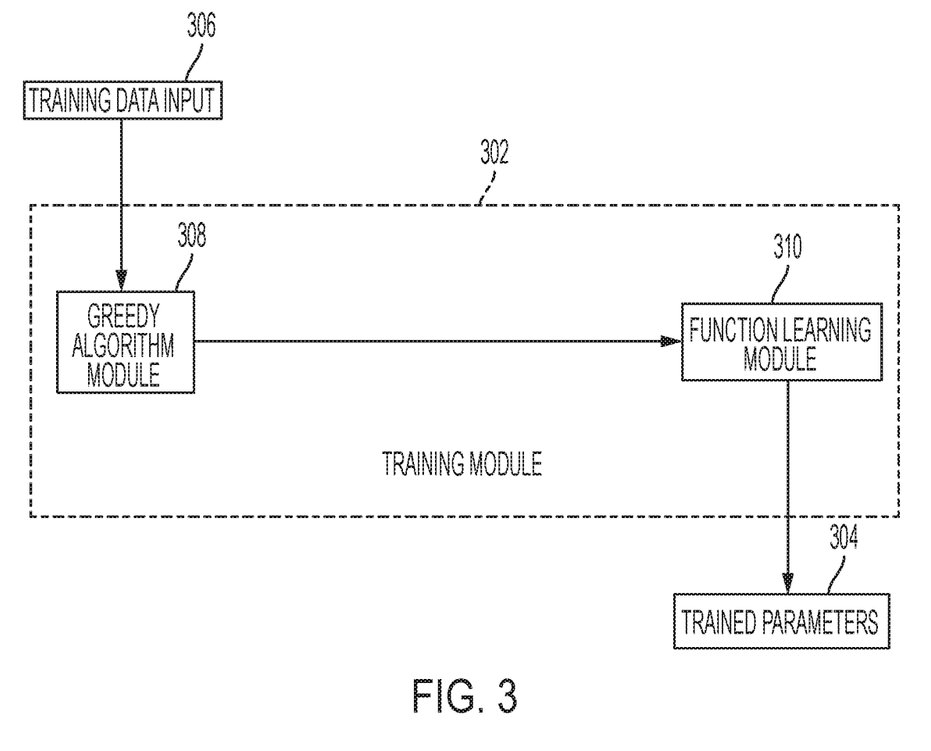
FIG. 3 depicts an example of a computing environment for training the summary generation model of FIG. 1, according to certain embodiments of the present disclosure.

FIG. 3 depicts an example of a computing environment 300 for training the summary generation model 106. The computing environment 300 includes a training module 302 that performs training operations for trainable parameters of the summary generation model 106. The training processes performed by the training module 302 may involve determining values of trained parameters 304, such as trainable parameters of the task-specific encoding $e_i^{(c)}$ (e.g., γ and $s_{0,1,2}$ of Equation 1), trainable parameters of the LSTM layers of the contextual embedding, and trainable parameters of the selection probability function (e.g., $W_s$ and $b_s$ of Equation 2).

Initially, the training module 302 receives or otherwise accesses training data input 306. The training data input 306 may include a set of pairs of text. Each pair of text may include a source text and a corresponding summary, where a number of words included in the summary is much smaller than a number of words included in the source text. Examples of the training data input 306 may include a CNN-Daily Mail (CNNDM) corpus that includes source document news articles and summaries corresponding to the news articles. Other training corpuses may also be used. In an example, the source documents may be truncated to 400 word tokens (e.g., a representation of 400 words from each of the source documents), and the summary documents may be truncated to 100 word tokens for consistency. Other numbers of word tokens may also be used during training. Further, the training module 302 is able to solve the issues associated with other existing data intensive summary generation techniques because the training module 302 is trainable with a corpus of training data that is much smaller than a corpus of training data required for the other existing data intensive summary generation techniques.

Because the summaries are sentential (e.g., made up of complete sentences from the source document), the summary generation model 106 can be trained by the training module 302 as a sequence tagging problem. For example, $t_1, \ldots, t_n$ denotes binary tags for each token (e.g., word) in the source document of the training data input 306, where the binary tags indicate whether each token of the source document is used in both the source document and the summary document. Assuming $t_i$ is 1 if a word is copied from the source document to the summary document and 0 otherwise, the goal of the training module 302 is to learn the trained parameters 304 that maximize a conditional probability represented by the following equation:

$$\log p(t|x) = \Sigma_{i=1}^n \log p(t_i|x) \quad \text{(Equation 5)}$$

where x corresponds to the text of the source document, and the log term is used to provide numerical stability when dealing with lengthy source documents.

Because the training data input 306 does not provide an indication of which words from the source document are actually used in the summary document, a greedy algorithm module 308 may be used to align the words from the source document and the summary document. A greedy algorithm of the greedy algorithm module 308 may be used to match a longest common subsequence of terms between the source document and the summary document. Two assumptions may be made about the summary generation process described herein. First, a sequence of words is copied from the source document to the summary document only if there is not a longer sequence that matches the summary document. Second, if there are two or more similar phrases, only the first occurrence of the similar phrase is copied from the source document to the summary document. Thus, a word $x_i$ is marked as copied by a binary tag (e.g., $t_i=1$) if (1) it is part of the longest possible subsequence of tokens, as indicated by the following equation:

$$s = x_{i-j:i:i+k} \quad \text{(Equation 6)}$$

for integers j≤i; k≤(n−1), if s ∈x and s ∈y, and (2) there is not earlier sequence u with s=u. A result of the greedy algorithm provides a supervised approach to a sequence tagging problem that does not by default have supervised data.

The function learning module 310 uses the binary tokens $t_i$ to train the trainable parameters of the of the task-specific encoding $e_i^{(c)}$ (e.g., γand $s_{0,1,2}$ of Equation 1), trainable parameters of the LSTM layers of the contextual embedding, and trainable parameters of the selection probability function (e.g., $W_s$ and $b_s$ of Equation 2). The training is performed to maximize the conditional probability of Equation 5. Once the trainable parameters converge, the training module can provide the trained parameters 304 for use by the summary generation module 106.

Figure 4:
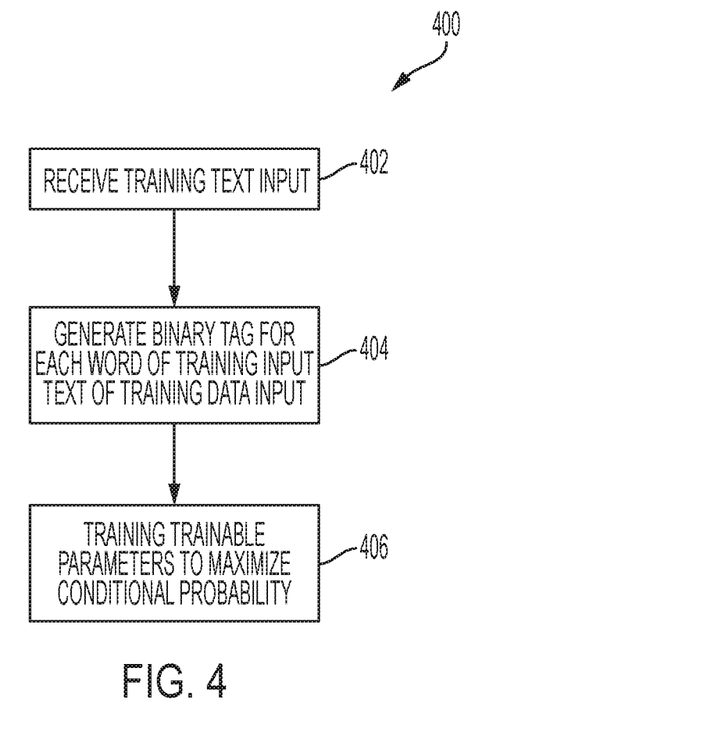
FIG. 4 depicts an example of a process for training the summary generation model of FIG. 1, according to certain embodiments of the present disclosure.

FIG. 4 is an example of a process for training the summary generation model 106. As discussed above, the trainable parameters of the summary generation model 106 are trained to maximize Equation 5 using the training data input 306. One or more processing devices implement operations depicted in FIG. 2 by executing suitable program code (e.g., the training module 302). For illustrative purposes, the process 400 is described with reference to certain examples depicted in the figures. Other implementations, however, are possible.

At block 402, the process 400 involves receiving the training data input 306 at the training module 302. One or more processing devices execute the training module 302 (or suitable other program code) to implement block 402. For instance, executing the training module 302 causes one or more processing devices to receive or otherwise access the training data input 306 that is stored in a non-transitory computer-readable medium. In some embodiments, receiving or accessing the training data input 306 involves communicating, via a data bus, suitable signals between a local non-transitory computer-readable medium and the processing device. In additional or alternative embodiments, receiving or accessing the training data input 306 involves communicating, via a data network, suitable signals between a computing system that includes the non-transitory computer-readable medium and a computing system that includes the processing device. Examples of the training data input 306 include a CNN-Daily Mail (CNNDM) corpus that includes source document articles from news sources and summaries corresponding to the articles. Other training corpuses may also be used.

At block 404, the process 400 involves generating a binary tag for each word of the source document of the training data input 306. One or more processing devices execute the greedy algorithm module 308 (or other suitable program code) to implement block 404. For instance, executing the greedy algorithm module 308 matches a longest common subsequence of terms between the source document and the summary document, as described above with respect to FIG. 3. The words of the source document that are matched to the summary by the greedy algorithm may receive binary tags with a value of "1" while the remainder of the words in the source document receive binary tags with a value of "0."

At block 406, the process 400 involves training the trainable parameters of the summary generation model 106. One or more processing devices execute the function learning module 310 (or other suitable program code) to implement block 406. For instance, the function learning module 310 uses the binary tokens $t_i$ to train the trainable parameters of the of the task-specific encoding $e_i^{(c)}$ (e.g., $\gamma$ and $s_{0,1,2}$ of Equation 1), trainable parameters of the LSTM layers of the contextual embedding, and trainable parameters of the selection probability function (e.g., $W_s$ and $b_s$ of the sigmoid function of Equation 2). The training is performed to maximize the conditional probability of Equation 5. Once the trainable parameters converge, the training module can provide the trained parameters 304 for use by the summary generation module 106.

Example of a Computing System for Executing a Searchable Tag Identifier Module

Figure 5:
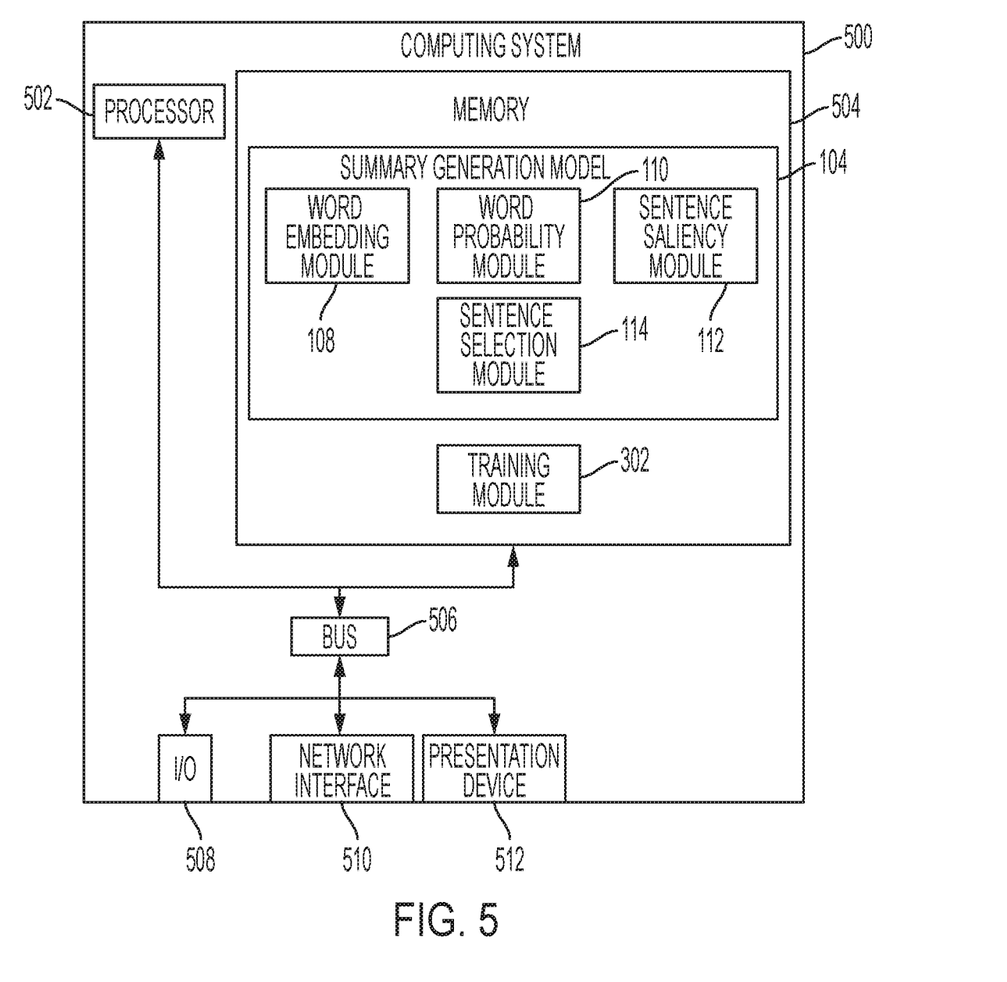
FIG. 5 an example of a computing system for performing various operations described herein, according to certain embodiments of the present disclosure.

Any suitable computing system or group of computing systems can be used for performing the operations described herein. FIG. 5 depicts an example of a computing system 500 for performing various operations described herein, according to certain embodiments of the present disclosure. In some embodiments, the computing system 500 executes the summary generation model 106 and the training module 302, as depicted in FIG. 5. In other embodiments, separate computing systems having devices similar to those depicted in FIG. 5 (e.g., a processor, a memory, etc.) separately execute the summary generation model 106 and the training module 302.

The depicted example of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 may also include a number of external or internal devices, such as input or output devices. For example, the computing system 500 is shown with one or more input/output ("I/O") interfaces 508. An I/O interface 508 can receive input from input devices or provide output to output devices. One or more buses 506 are also included in the computing system 500. The bus 506 communicatively couples one or more components of a respective one of the computing system 500.

The computing system 500 executes program code that configures the processor 502 to perform one or more of the operations described herein. The program code includes, for example, the summary generation model 106 (including the word embedding module 108, the word probability module 110, the sentence saliency module 112, and the sentence selection module 114), the training module 302, or other suitable applications that perform one or more operations described herein. The program code may be resident in the memory device 504 or any suitable computer-readable medium and may be executed by the processor 502 or any other suitable processor. In additional or alternative embodiments, the program code described above is stored in one or more other memory devices accessible via a data network.

The computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and/or the like. The computing system 500 is able to communicate with one or more other computing devices via a data network using the network interface device 510.

In some embodiments, the computing system 500 also includes the presentation device 512. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the computing system 500 using one or more data networks described herein. Other aspects can omit the presentation device 512.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for generating a summary, wherein the method includes one or more processing devices performing operations comprising:
    generating a set of word embeddings corresponding to each word of a text input;
    generating a set of selection probabilities corresponding to each word of the text input using the respective word embeddings, wherein generating the set of selection probabilities comprises:
    concatenating a static channel word embedding and a contextual word embedding of a first word of the text input into a first vector;
    generating a first word representation of the first word by inputting the first vector comprising a trainable neural network comprising a bidirectional long short-term memory neural network; and
    generating a first selection probability of the set of selection probabilities using a sigmoid function comprising the first word representation and at least one trainable neural parameter of the trainable neural network;
    calculating a set of sentence saliency scores for a set of sentences of the text input using respective selection probabilities of the set of selection probabilities for each word of the text input; and
    generating the summary of the text input using a subset of sentences from the set of sentences with greatest sentence saliency scores from the set of sentence saliency scores.

2. The method of claim 1, wherein the operation of generating the set of word embeddings comprises generating a static channel word embedding and a contextual word embedding of each word of the text input.

3. The method of claim 1, wherein the operation of calculating a set of sentence saliency scores further comprises:
    generating a probability sum of a first sentence of the set of sentences by summing a respective selection probability of the set of selection probabilities for each word within the first sentence; and
    generating a first sentence saliency score of the set of sentence saliency scores by dividing the probability sum by a number of words within the first sentence.

4. The method of claim 1, wherein the subset of sentences from the set of sentences is determined by selecting sentences from the set of sentences with respective sentence saliency scores greater than a sentence saliency score threshold.

5. The method of claim 1, wherein the one or more processing devices perform operations further comprising:
    receiving training data comprising a training text input and a summary corresponding to the training text input;
    generating a binary tag for each word of the training text input using a greedy algorithm; and
    training (i) a first set of trainable parameters of a sigmoid function identifying a probability that each word of the training text input is used in the summary and (ii) a second set of trainable parameters of a contextual embedding, wherein training the first set of trainable parameters and the second set of trainable parameters is accomplished by maximizing a conditional probability of an accuracy of the binary tag generated for each word.

6. The method of claim 5, wherein the set of selection probabilities for each word of the text input is generated using the sigmoid function with the first set of trainable parameters.

7. The method of claim 5, wherein the second set of trainable parameters of the contextual embedding comprise two trainable bidirectional long short-term memory neural network layers.

8. A computing system comprising:
    means for receiving training data comprising a training text input and a summary corresponding to the training text input;
    means for generating a binary tag for each word of the training text input using a greedy algorithm;
    means for training a summary generation model by training (i) a first set of trainable parameters of a sigmoid function identifying a probability that each word of the training text input is used in the summary and (ii) a second set of trainable parameters of a contextual embedding, wherein training the first set of trainable parameters and the second set of trainable parameters is accomplished by maximizing a conditional probability of an accuracy of the binary tag generated for each word;
    means for generating a set of word embeddings corresponding to each word of a text input;

means for generating a set of selection probabilities corresponding to each word of the text input using the respective word embeddings;

means for calculating a set of sentence saliency scores for a set of sentences of the text input using respective selection probabilities of the set of selection probabilities for each word of the text input; and means for generating a text input summary of the text input using a subset of sentences from the set of sentences with greatest sentence saliency scores from the set of sentence saliency scores.

9. The computing system of claim 8, wherein the means for generating the set of word embeddings comprises generating a static channel word embedding and a contextual word embedding of each word of the text input.

10. The computing system of claim 8, wherein the means for calculating a set of sentence saliency scores further comprises:

generating a probability sum of a first sentence of the set of sentences by summing a respective selection probability of the set of selection probabilities for each word within the first sentence; and generating a first sentence saliency score of the set of sentence saliency scores by dividing the probability sum by a number of words within the first sentence.

11. The computing system of claim 8, wherein the subset of sentences from the set of sentences is determined by selecting sentences from the set of sentences with respective sentence saliency scores greater than a sentence saliency score threshold.

12. The computing system of claim 8, wherein the means for generating the set of selection probabilities comprises:

means for concatenating a static channel word embedding and a contextual word embedding of a first word of the text input into a first vector;

means for generating a first word representation of the first word by inputting the first vector into a bidirectional long short-term memory neural network; and means for generating a first selection probability of the set of selection probabilities using the sigmoid function comprising the first word representation and at least one trainable neural parameter.

13. The computing system of claim 8, wherein the set of selection probabilities for each word of the text input is generated using the sigmoid function with the first set of trainable parameters.

14. The computing system of claim 8, wherein the second set of trainable parameters of the contextual embedding comprise two trainable bidirectional long short-term memory neural network layers.

15. A non-transitory computer-readable medium having instructions stored thereon, the instructions executable by one or more processing devices to perform operations comprising:

generating a static channel word embedding and a contextual word embedding corresponding to each word of a text input;

generating a set of selection probabilities corresponding to each word of the text input using the respective word embeddings, wherein generating the set of selection probabilities comprises:

concatenating a static channel word embedding and a contextual word embedding of a first word of the text input into a first vector;

generating a first word representation of the first word by inputting a first vector comprising a trainable neural network comprising a bidirectional long short-term memory neural network; and generating a first selection probability of the set of selection probabilities using a sigmoid function comprising the first word representation and at least one trainable neural parameter of the trainable neural network;

calculating a set of sentence saliency scores for a set of sentences of the text input using respective selection probabilities of the set of selection probabilities for each word of the text input; and generating a summary of the text input using a subset of sentences from the set of sentences with greatest sentence saliency scores from the set of sentence saliency scores.

16. The non-transitory computer-readable medium of claim 15, wherein the one or more processing devices perform operations further comprising:

receiving training data comprising a training text input and a summary corresponding to the training text input;

generating a binary tag for each word of the training text input using a greedy algorithm; and training (i) a first set of trainable parameters of a sigmoid function identifying a probability that each word of the training text input is used in the summary and (ii) a second set of trainable parameters of a contextual embedding, wherein training the first set of trainable parameters and the second set of trainable parameters is accomplished by maximizing a conditional probability of an accuracy of the binary tag generated for each word.

17. The non-transitory computer-readable medium of claim 15, wherein the operation of calculating a set of sentence saliency scores further comprises:

generating a probability sum of a first sentence of the set of sentences by summing a respective selection probability of the set of selection probabilities for each word within the first sentence; and generating a first sentence saliency score of the set of sentence saliency scores by dividing the probability sum by a number of words within the first sentence.

18. The non-transitory computer-readable medium of claim 15, wherein the subset of sentences from the set of sentences is determined by selecting sentences from the set of sentences with respective sentence saliency scores greater than a sentence saliency score threshold.

* * * * *